United States Patent Office 2,886,121
Patented May 12, 1959

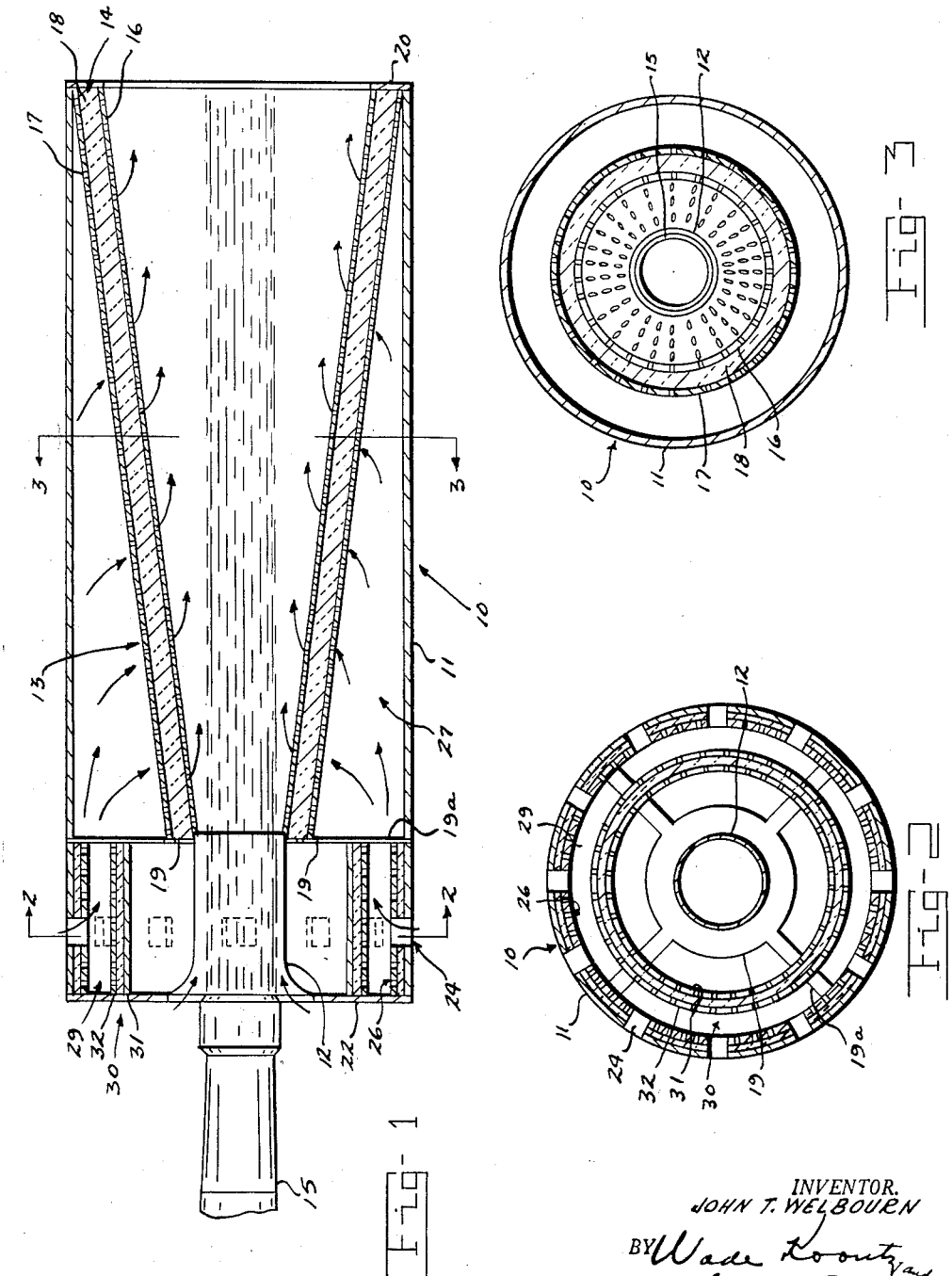

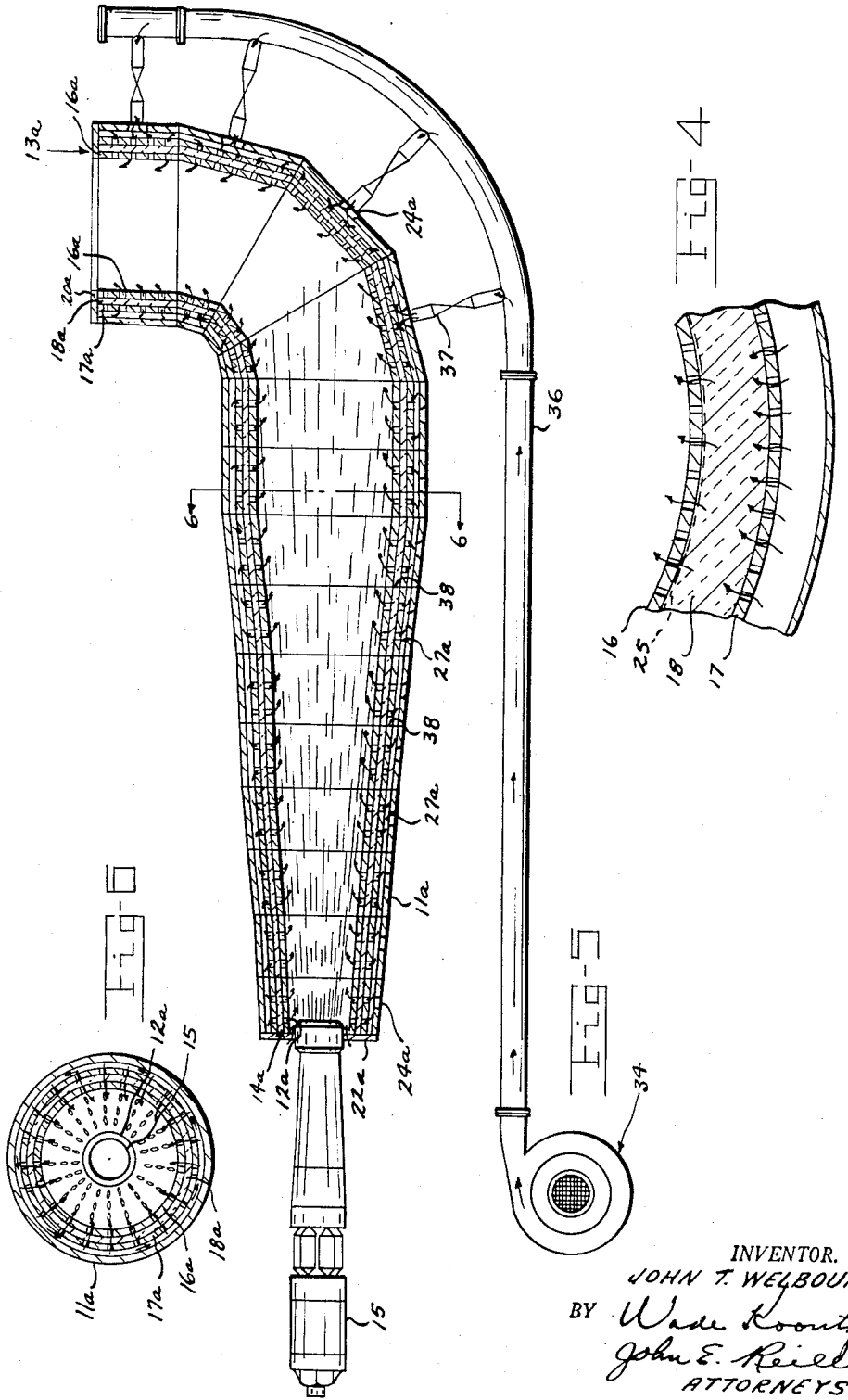

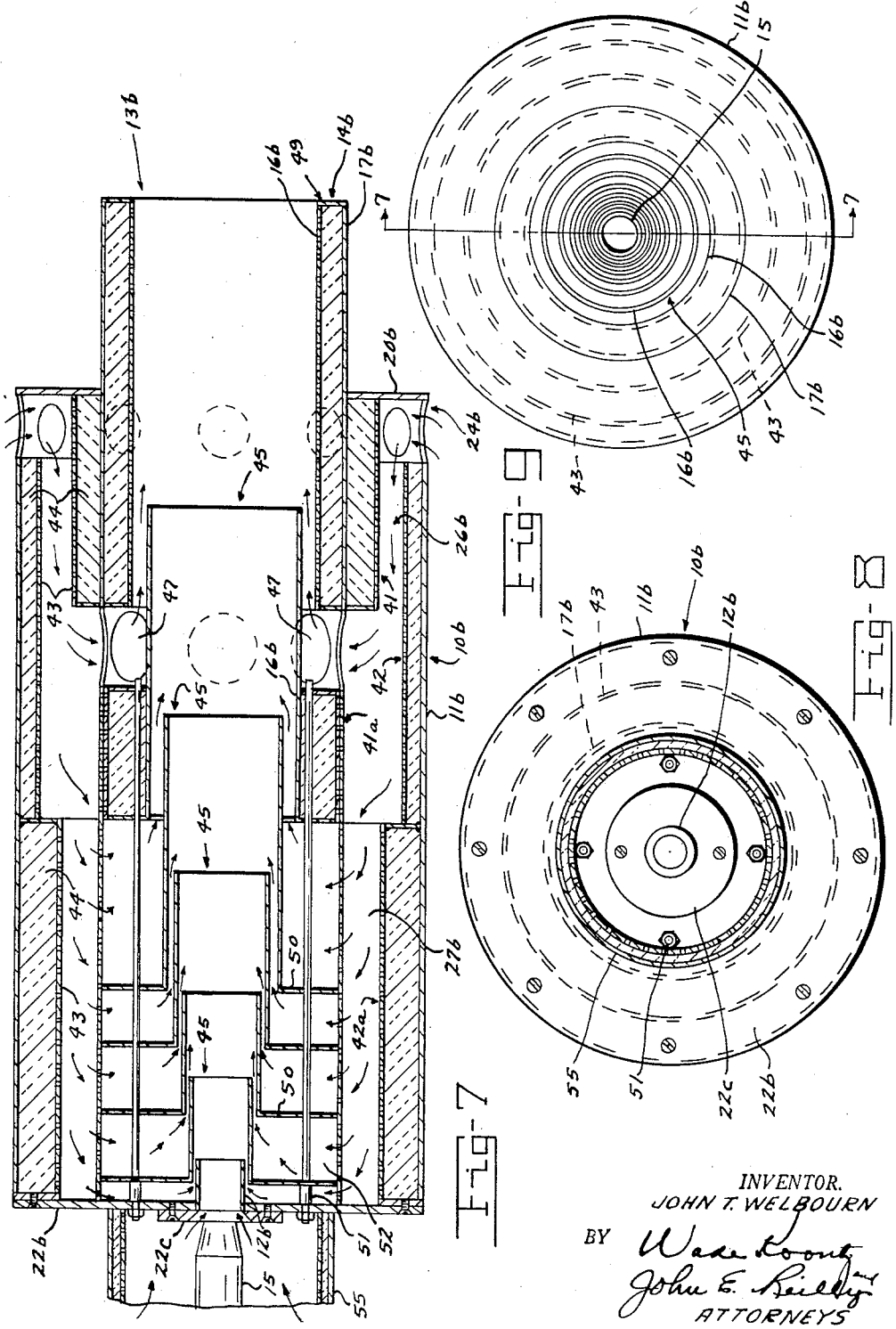

2,886,121

AIR-COOLED SILENCER

John T. Welbourn, Pittsburgh, Pa.

Application October 25, 1956, Serial No. 618,412

20 Claims. (Cl. 181—42)

(Granted under Title 35, U.S. Code (1952), sec. 266)

The invention described herein may be manufactured and used by or for the United States Government for governmental purposes without payment to me of any royalty thereon.

The present invention relates to an air-cooled silencer or muffler construction for the silenced discharge of gases during the ground testing of jet engines or similar types of aircraft engines; and more particularly to an air-cooled silencer which is constructed in such a way that cooling air may be induced or blown into the muffler in a unique manner so as to effect direct cooling of the acoustical material and muffler wall structure and thereby prevent damage from heat released by the gases passing through the muffler unit.

In the development of jet engine test cells, a major problem involves the construction of the exhaust muffler structure either in combination with an entire test stand installation or as a separate structure to receive the hot gases discharged from a jet engine or the like, the gases being expelled in a high velocity and a high pressure state so as to produce a high intensity noise condition. To reduce or silence the noises the present muffler constructions have been directed to a silencer structure of specially constructed material which has high heat and pressure resistance. The former approach to this problem has constituted an attempt to cool the discharged gases as they pass through the muffler by the admission of air into the exhaust stream and to rely on the specially selected materials to withstand the resultant temperature and pressure condition. Also, water has been employed to aid in the cooling of the exhaust gases. As a result, the muffler constructions in present use are expensive to make and maintain, require special materials, in addition to the requirement of a water supply for the necessary cooling of the gases.

It is therefore an object of the present invention to provide a unique air-cooled silencer structure which is economical to make and maintain, can be made from readily available materials, and requires no water for cooling the discharge gases.

Another object is to provide a novel muffler wall structure which will permit the evenly distributed flow of air therethrough in order to form a moving layer of cooling air insulating the muffler wall structure from the discharge gases.

Another object is to provide an air-cooled sound absorption system constructed and arranged so as to develop a series of cooling passages throughout the muffler wall structure for cooling of the structure itself instead of the discharge gases and to prevent contact between the discharge gases and wall structure.

Another object is to provide a rearwardly divergent muffler structure to reduce the velocity of flow of the discharge gases before impingement into the atmosphere and in which it is not necessary to utilize sound absorption materials adjacent the high velocity gas stream.

Another object is to provide an air-cooled muffler construction which can be designed for the controlled admission of air through and about the muffler wall structure and into the discharge gas passages of the muffler in order to reduce the turbulence and temperature effect of the discharge gases on the muffler.

An additional object is to provide a compact, air-cooled muffler arrangement in which inexpensive, commercially available materials are of curved or cylindrical configuration in order to provide the greatest strength with a minimum amount of material.

It is a further object to provide a compact, inexpensive, air-cooled muffler construction in which the silencing of the cooling air can be accomplished by means of inlet air passages internally disposed within the muffler construction in place of external cooling duct arrangements.

It is a still further object to provide a compact, air-cooled muffler construction which is adaptable for use as a separate unit or as an integrated section of a jet test stand installation and which can be used in remote or isolated areas without requiring a water supply as a part of its cooling system.

Other objects and advantages are more fully set forth in the following detailed description of the construction and operation of the silencer unit, together with the drawings, in which like reference numerals indicate like parts:

Fig. 1 is a longitudinal section view of a preferred form of muffler construction;

Fig. 2 is an end section view taken on lines 2—2 of Fig. 1;

Fig. 3 is another end view in section of the preferred form taken on lines 3—3 in Fig. 1;

Fig. 4 is a detailed fragmentary view in section of the muffler wall structure shown in Figs. 1–3;

Fig. 5 is a longitudinal view of a modified construction in section illustrating an accessory blower system and valves for the introduction of air under positive pressure into the muffler;

Fig. 6 is an end view in section of the muffler construction taken on lines 6—6 of Fig. 5;

Fig. 7 is a longitudinal section view of another modified form of muffler construction;

Fig. 8 is a front end plan view of the muffler construction set out in Fig. 7; and Fig. 9 is a rear end plan view of the muffler construction shown in Fig. 7.

Referring more particularly to the drawings, there is shown in Figs. 1–3 the preferred form of muffler construction which includes an air-cooled silencer or muffler construction 10 comprised generally of an outer cylindrical, silencer shell or casing 11 extending the length of the silencer and inclosing at its forward end an inner concentric tube or conduit portion 12 which defines the inlet mouth of the silencer to receive the discharge gases from a jet engine 15, and a rearwardly divergent gas exhaust muffler 13 forming a rearward continuation of the inlet tube 12 having a muffler wall 14 throughout which there is provided a series of passages at spaced intervals along the wall for the flow of air into the muffler chamber. The outer silencer shell 11 is also provided with suitable air inlet ports 24 together with an inlet passage 26 for the introduction of cooling air into an annular chamber 27 between the outer silencer shell 11 and wall structure 14 of the muffler.

The invention consists essentially in the construction of the frusto-conical shaped muffler wall structure 14 as shown in Fig. 4 which is composed of an interior perforated lining or acoustical facing 16 and exterior perforated lining or acoustical backing 17 in spaced, concentric relation with Fiberglas or granular porous, sound absorbing materials 18 inserted or packed between the linings together with an inner fabric liner 25 disposed adjacent the interior lining surface 16. The number and size of the perforations in the linings 16 and 17 can be regulated in order to control the rate and quantity of air flow into the muffler chamber.

Both the interior and exterior linings which retain the acoustical materials including the fabric liner can be of ordinary commercial steel or other comparatively inexpensive materials since the perforated linings are not required to withstand the elevated temperatures of the exhaust gases. Instead, the air flow passages formed by the perforations in the linings will conduct a sufficient amount of outside cooling air into the muffler to form a moving layer of air filling the low pressure area surrounding the exhaust stream, the low pressure area being developed by the high velocity gas flow through the muffler. This steady flow of air through the passages in the muffler wall and into the muffler chamber thus not only directly cools the muffler wall but also acts as an insulating layer between the high temperature discharge gases and wall structure so as to effectively block any penetration of heat from the gases into the wall structure and thereby maintain the muffler wall at a low, steady state temperature.

Although it would be possible to form a tubular muffler section, it is particularly advantageous in this cooling arrangement to form a rearwardly divergent muffler wherein the gases will be increasingly reduced in velocity as they flow toward the exhaust end of the muffler. In this way the greatest amount of air will be introduced in the gas entrance opening into the muffler where both the velocity and temperature of the gases are the highest since the lowest pressure area will be developed at this point and the greatest need for heat exchange is present.

An additional advantage in maintaining a separate layer of air to cool the wall structure rather than by intermixing the air with the gases is the reduction in turbulence and the consequent reduction in noise generation which results. In addition, the moving layer of air not only serves as an insulating means against heat but also serves to muffle much of the noise. In this connection, the choice of sound absorbing material does not become so critical in that the material does not have to withstand high temperatures thus enabling the selection of materials for properties other than resistance to heat; also, the intensity of noise, being reduced does not require a thick acoustical wall structure in the muffler and permits more efficient and rapid air flow through the wall structure.

The muffler wall structure 14 is disposed within the outer silencer shell 11 by connecting the forward edge of the wall to the surface of an annular support plate 19, the purpose of which will be discussed later, adjacent the outlet of the gas inlet tube 12. The exhaust end of the muffler is supported, in turn, by interconnecting the rearward edge of the muffler together with the rearward edge of the outer shell by means of a ring shaped connector plate or flange 20.

The gas inlet tube 12 is designed in the shape of a bellmouth flared outwardly at its forward edge and is of a diameter slightly larger than the exhaust stream expelled from the discharge end of the jet engine so as to receive not only the discharge gases but also a slight amount of outside air. Of course, other suitable forms of gas inlet tubes or passages can be used in place of the preferred construction for receiving the gas and conducting it into the exhaust muffler. The gas inlet tube 12 is supported centrally within the forward end of the outer shell 11 by means of the annular plate 19 placed over the rearward end of tube having radially outwardly disposed spokes or bars 19a extending through the wall of the shell for connection thereto, and a forward, annular connecting plate 22 interconnecting the outwardly flared portion of the tube 12 and the forward end of the outer shell 12, the plate 22 being secured in place either by welding or bolt attachments as shown, or other suitable means.

In that the air will be induced to flow into the muffler chamber at high rates of flow, inlet ports 24 are arranged circumferentially about the forward end of the outer shell for introduction of cooling air into the muffler with an insulated wall portion 26 surrounding each of the ports to somewhat silence the inward flow of air. The wall portion 26 forms an interior lining about the forward end of the shell made up of an inner perforated facing to retain acoustical material along the inner surface of the shell 11. As can be seen, in addition to forming a wall surrounding the inlet ports 24, the lining 26 also serves as an outer wall for an inlet air silencer passage 29, an inner concentric wall 30 being spaced between the outer shell and inlet tube 12, and comprised of an inner cylindrical backing plate 31 and acoustical facing plate 32 spaced outwardly therefrom with Fiberglas or granular sound absorbing material packed between the plates 31 and 32. Air is thus conducted through the inlet ports 24, along the air silencer passage 29 and into the annular air flow chamber 27 for induced flow through the passages of the muffler wall structure 14. Other suitable air silencer inlet means could be provided in place of the above described arrangement; however, the internally disposed passageway construction is advantageous in that a single shell inclosure can be utilized to house the entire muffler section along with the secondary air silencer conduits. Of course, if it is found necessary to provide additional sound absorbing means for the secondary air flow into the muffler, acoustical ducts can easily be connected into the inlet ports 24 as provided for in copending application Serial Number 615,725, dated October 12, 1956, now Patent No. 2,823,756 granted February 18, 1958.

A modified form of the present invention is illustrated in Figs. 5 and 6 wherein a muffler wall structure 14a is formed substantially similar to the wall structure 14 as shown in Figs. 1–3. A rearwardly divergent elbow shaped muffler arrangement 13a constitutes a noise limiting passageway for the jet blast. The elbow shaped configuration of the duct or muffler can be utilized where it is desired to direct the discharge gases in a direction perpendicular to the direction of the original flow of the gases, either by disposing the exhaust end of the muffler in an upward or horizontal direction to the main entrance portion of the muffler.

The same principle is employed in this elbow shaped configuration as in the preferred form, namely that of introducing air through passageways in the muffler wall structure 14a to cool and insulate linings 16a and 17a and sound absorbing or acoustical material 18a to prevent damage from the high temperature gases. At the same time, an additional problem presents itself in the use of an elbow shaped muffler configuration since the exhaust stream will tend to flow directly against the inner lining of the outer wall structure in the elbow section instead of creating a low pressure area around the inner lining as is normally the case. Consequently, it becomes necessary to provide some means to force air under positive pressure into the wall structure in the elbow section which will be sufficient to counteract the discharge gas flow directed against the wall structure in order to cool the linings and acoustical material. This is accomplished in a unique way by providing a low pressure air blower 34 to force air through a header line 36 and air supply valves 37 interconnecting the header line and inlet ports 24a provided at spaced intervals along the outer shell in the elbow section.

In the construction of the muffler wall structure it is preferred to divide the wall into a series of separate annular compartments in order to more easily shape the wall structure in the elbow section. To maintain a predetermined pressure through each of the wall sections and to develop an even flow of air throughout the muffler wall, the annular air flow chamber 27a formed between the shell 11a and exterior lining 17a is divided by means of annular divider plates or septums 38 positioned at spaced intervals along the muffler wall between the outer surface of the interior lining 16a and the inner surface of the shell 11a.

The outer silencer shell 11a is disposed over the wall structure 14a in outer, spaced and concentric relation so as to follow the contour of the muffler. The septums 38 are connected along their outer edges to the inner surface of the shell 11a thus forming the separate air flow chambers or manifolds 27a between the septums and around the outer surface of the exterior lining 17a. Inlet ports 24a are passed through the outer shell for introduction of cooling air into each of the annular air flow chamber sections with a single port provided for each muffler section, the ports being arranged along the length of the outer portion of the elbow shaped shell. For increased flow of secondary air into the exhaust muffler additional ports can be arranged circumferentially about each muffler section in which case additional air supply headers 36 would be provided for the supply of air into the elbow section ports.

The outer shell 11a is preferably constructed, as shown, in separate sections for positioning over the corresponding sections of the muffler wall 14a, then secured together along the section edges, by welding or other suitable means.

In that a series of ports are provided along the entire length of the air silencer it is not ordinarily necessary to provide air silencing means for the secondary air flow into the muffler walls, since each port will accommodate only a small portion of the air flow through the muffler wall. For extremely high capacity jet engines, however, it is often necessary to connect air silencer ducts into each of the inlet ports with the exception of the ports in the elbow section. In the elbow section the air can be silenced by insulating the ducts leading from the air supply valves 37.

The gas entrance opening at the forward end of the exhaust muffler also acts as the mouth inlet 12a in place of a separate tube as described in the preferred form of invention. An annular, ring shaped connecting plate 22a interconnects the muffler wall structure 14a and outer shell 11a at the forward end and is tapered inwardly at its inner edge for connection to the interior lining of the muffler wall to form an outwardly flared portion so that cooling air can be induced into the muffler chamber between the discharge end of the jet engine and the inlet wall of the muffler.

The operation of both the straight and elbow shaped mufflers are substantially the same. A typical source of high intensity noise in which a large part of the noise is generated by a high velocity high gas stream, such as a turbo jet engine, is indicated flowing through the muffler. This hot gas is discharged through the bellmouth or jet inlet portion 12 as in Fig. 1 and induces a small amount of secondary cooling air to flow along with the hot gas. For best performance, it is anticipated that the diameter of the forward section of the bellmouth should be slightly larger than the diameter of the hot gas blast. The high velocity exhaust stream then flows through the major section of the muffler contained within the outer shell 11. This gas flow causes a drop in pressure within the muffler chamber and air flows through the passages in the muffler wall from the free spaces within the acoustical material 18. The resulting pressure drop in the muffler wall causes air to flow from the annular cooling air flow chamber 27 surrounding the muffler wall 14 to replace that lost from the spaces in the acoustical material. The rate of air flow as mentioned can be controlled by the proper sizing and number of perforations in perforated linings 16 and 17. To replenish the air within the air chamber, cooling air is drawn from the outside through the inlet ports 24 or air silencer ducts, if necessary.

Where the elbow-shaped configuration is used, the air is forced under positive pressure into the elbow section with sufficient force to provide a barrier against the penetration of the muffler wall structure by the hot discharge gases. In this situation by providing a rearwardly divergent wall structure the velocity of the discharge gases will have been appreciably reduced upon reaching the elbow section and thus makes possible the formation of a layer of moving air along the inner surface of the muffler in the elbow section which will effectively block the hot gas blast. It is to be noted in this respect that the exhaust stream will be directed against the muffler wall structure over a substantially concentrated area along the outer portion of the elbow section only, so that by positioning the ports 24a in the elbow section throughout this area the air will be forced into the muffler section so as to flow against the exhaust stream. In addition to a direct counter flow into the muffler wall structure opposite the inlet ports 24a air will also tend to flow in a circular path completely filling the annular chambers and flowing through the wall structure to form an even layer of moving air along the inner surface of the interior linings 16a.

Another modified form of the air-cooled silencer unit 10b is illustrated in Figs. 7–9 in which an outer silencer shell or casing 11b incloses an inner concentric tubular portion 17b projecting rearwardly from outer shell 11b, the tubular portion forming the outer lining of an exhaust muffler 13b for the discharge of hot pressurized gases. The basic principle of invention in this modified form is essentially the same as that in the two previously described forms in which air is introduced through spaced apart air flow passages in the muffler wall structure for cooling the wall structure itself instead of the discharge gases. In Fig. 7, the muffler 13b is spaced concentrically within the outer shell so as to form an annular cooling air flow chamber 27b between the wall structure 14b and the outer shell 11b.

Disposed circumferentially about the rearward end of the outer shell 11b are a plurality of inlet ports 24b for the introduction of cooling air into an inlet air passageway 26b, the annular passageway 26b being formed by an inner acoustical wall section 41 and outer acoustical wall section 42. The inner wall section 41 incases an intermediate portion of the exterior lining 17b of the exhaust muffler, and the outer wall section 42 is lined within the outer shell 11b, each of the wall sections 41 and 42 being comprised of an acoustical facing 43 and acoustical, sound absorbing material 44 packed between the facing 43 and the outer surface of the exterior lining 17b and outer shell 11b respectively. The remainder of the outer shell portion is lined with an acoustical wall section 42a which is of increased thickness due to its more direct exposure to the sound waves from the discharge gases. Also, additional insulation is disposed in a wall section 41a between the exterior lining 17b and an inner lining 16b of a flow control tube 45 to further insulate the inlet air.

The muffler wall structure 14b consists of the exterior lining 17b and the interior linings 16b, the inner linings being made up of a plurality of air flow control tubes 45 which are staggered rearwardly in outward, concentric relation from a forward gas inlet tube 12b back to the rearward end of the muffler. The exterior lining or packing 17b is constructed of a generally cylindrical member which is perforated throughout the forward portion thereof so as to form an air flow control surface from the annular air flow chamber 27b into the muffler. Additional inlet ports 47 are arranged circumferentially about the exterior lining 17b just behind the perforated section to conduct an increased volume of air into the muffler, and an imperforate cylinder section forms the rearward end of the exterior lining and acts as a backing support for the inner wall section 41 along with a similar acoustical wall section 49 which forms a sound absorbing exhaust section for the discharge gases extending the length of the rearward end.

The air flow control tubes 45 are constructed of sheet metal or similar material with each tube or cylinder disposed in overlapping, spaced relation to the inner concentric tube positioned in front of it, and each is provided with an annular divider plate 50 extending laterally outwardly from the forward end of each tube for connection to the exterior lining 17b. The air flow control tubes 45 along with the divider plates 50 are additionally supported in fixed, telescoping position by a plurality of circularly arranged support rods 51 which are passed axially from and connected to the forward connection plate 22b through each of the divider plates 50 and the insulated wall section 41a where they are attached to the side panel of the wall section 41a.

The air flow control tubes 45 with the connected divider plates 50 and the perforated section of the exterior lining 17b form air flow passages 52 for the induced flow of air from the annular chamber 27b and between the spaced air flow control tubes to provide a barrier or moving layer of air along the interior lining of the muffler. In this respect the muffler wall structure functions in much the same way as the previously described wall structures 14 and 14a. The air flow passages serve an added function in that they act as broad band resonant chambers for the absorption of sound waves from the discharge gases. Of course, the air flow passages 52 need not be annular but may be separated by additional partitions into smaller chambers, the required size of the chambers being based upon the sound frequency to be absorbed. For instance, in large silencers more chambers may be required than in the smaller silencers.

The forwardmost inner concentric tube 12b acts not only as the gas entrance conduit for the discharge gases but also as one of the air flow control tubes. The tube 12b is connected to the forward connecting plate 22b with an outer plate 22c forming an outwardly flared lip portion into the inlet tube 12b for the admission of a small amount of outside air into the gas muffler along with the discharge gases. The forward connecting plate is connected along its outer peripheral face into the insulated acoustical wall 42a of the outer shell 11b by means of studs. Studs are also used to attach the outer plate 22c to the connecting plate 22b. The rearward end of the outer shell is also closed about the exterior lining 17b by means of an annular plate 20b which is welded or connected by other suitable means to the edge of the outer shell 11b and fits tightly over the muffler.

The air silencer unit is positioned in abutting relationship with an engine inclosure so that the inclosed jet engine 15 is positioned wtih its discharge end adjacent and essentially aligned with the gas in the tube 12b. The jet blast is directed through the series of air flow control tubes 45 and induces a small amount of cooling air to flow into the muffler from the engine inclosure unit between the inlet tube 12b and jet engine. The moving molecules of the jet gas drag adjacent air molecules along with it and create a partial vacuum surrounding the gas stream. The external air pressure then forces air into the partially evacuated spaces through the passages 52, the air removed from the passages 52 being replaced by the cooling air flow through ports 24b and the passageway 26b. The effect of the spaced air flow passages 52 is thus essentially the same as in the insulated wall structures for the previously described silencer units. Again, the cooling air is conducted through the sound absorbing passages and aspirated into the region of the high velocity, exhaust stream in such a manner that turbulence is reduced and less noise is produced to be removed by the muffler. In addition, the muffler construction in Fig. 7 reduces the noises of the discharge gases by absorption through constricted openings in the perforated metal and through a certain amount of resonating action in the air flow passages.

The muffler construction as hereinbefore set forth is adaptable for use not only as a separate unit but can be connected into an entire test stand installation. For example, in a particular test stand, such as, the installation described in copending application Serial Number 615,725, dated Oct. 12, 1956, now Patent No. 2,823,756 granted Feb. 18, 1958, the front connecting plate 22b can be positioned so as to abut the rearward panel of the engine inclosure unit for connection thereto. The secondary air for the muffler can either be drawn through separate air ducts leading into the inlet ports 24b or introduced directly through the ports, as described. Dependent upon the amount of silencing desired and the amount of gas flow, exhaust silencer ducts can be connected to the exhaust end of the muffler or the gas may be discharged directly into the outside air from the muffler.

Another important use of the muffler units disclosed is for the silenced exhaust for jet aircraft being tested on an air strip. For this operation, the muffler units can be utilized as separate portable units by placing and mounting the muffler on an adjustable or movable platform or vehicle and rolled into position behind the jet engine to receive the discharge gas. To support the muffler units any of the present supports in use are suitable. One way which has been found to be suitable is to position the muffler on saddle supports (not shown) comprising a row of semicircular formers to receive the curved belly of the outer shell.

As described, the primary feature of the present invention lies in the construction of the muffler wall in various novel and unique ways so that air can be aspirated into the low pressure area surrounding the exhaust stream through spaced air flow passages provided in the muffler wall structure. Furthermore, the muffler wall structure functions as an acoustical panel and resonant chamber for the sound waves accompanying the discharge gases. It is to be emphasized that the muffler wall structure described is not limited for use with the particular silencer constructions as set forth; but any suitable secondary air flow means can be combined which will provide an optimum rate of air flow to cool the muffler wall structure. It is believed that this represents a novel approach in muffler construction by cooling and insulating the exhaust muffler without any attempt to cool the discharge gases.

Certain additional features are believed to exist in the combination of the muffler wall construction with the entire silencer air flow unit as set forth, such as the use of positive pressure to force-cool the wall structure in mufflers where the exhaust stream is impinged against the wall structure, such as in the elbow shaped silencer unit as described.

Various other novel features have been set forth in the description of preferred embodiments of the present invention and it is to be understood that numerous changes, modifications and substitutions of equivalent constructions may be resorted to therein without departing from the spirit of the invention or the scope of the claims.

What is claimed is:

1. An air-cooled silencer for the silenced exhaust of discharge gases in the testing of jet engines or the like comprising: an outer tubular shell extending the length of said silencer having a plurality of spaced apertures extending along the length of said shell transversely therethrough; a discharge gas inlet member disposed at the forward end of said shell to receive the rearward discharge of gases from the engine; a rearwardly divergent sound absorbing muffler comprising a double walled member with a passageway communicating with said gas inlet member and incorporating interior and exterior liners in coaxial, spaced relation with sound absorption material disposed therebetween and having a plurality of perforations conducting air through said interior and exterior liners and the sound absorption material therebetween into the passageway at spaced intervals therealong so as to establish a moving layer of air along said interior liner for cooling said muffler structure.

2. An air-cooled sound absorption construction for exhaust gases in the ground testing of jet engines or the like, comprising: a generally cylindrical shaped sound absorbing duct having a gas entrance opening and gas exhaust opening and comprising inner and outer linings in spaced, concentric relation with sound absorption material disposed therebetween and a plurality of spaced conduits extending through said inner and outer linings; an outer casing positioned in spaced relation about said sound absorbing duct so as to define an annular air chamber therebetween, said casing having air inlet openings for the introduction of cooling air into said air chamber and through said plurality of spaced conduits to form an even layer of moving air in the low pressure area between the gas flow and said duct wall; and a generally tubular portion disposed at the gas entrance opening to conduct the discharge gases into said duct.

3. An air-cooled silencer construction for silencing the exhaust of discharge gases in the ground testing of jet engines or the like, comprising: a generally cylindrical outer shell having inlet ports arranged circumferentially about one end thereof and a sound absorbing lining disposed along the inner surface of said shell at the inlet end thereof; a gas inlet tube disposed concentrically within the forward end of said shell to receive the rearward discharge of gases from the jet engine; a rearwardly divergent exhaust muffler having a gas entrance opening communicating with the outlet end of said gas inlet tube and an exhaust opening at the opposite end thereof, the wall portion of said exhaust muffler having interior and exterior linings in coaxial, spaced relation and passages extending transversely through said wall portion, said wall and outer shell disposed in spaced relation so as to define an annular air flow chamber therebetween communicating with said passages; and a sound absorbing inner wall spaced concentrically within said outer shell adjacent the inlet ports of said outer shell so as to define an inlet air conduit between said inner wall and the sound absorbing lining of said outer shell for the silenced introduction of air into said annular air flow chamber, the passages in said muffler wall conducting air into said muffler so as to form a moving layer of air between said muffler and said discharge gases thereby insulating and cooling said muffler.

4. An air-cooled silencer construction to receive and exhaust gases discharged in the ground testing of jet engines or the like, comprising: a rearwardly expanding discharge gas muffler having a gas entrance opening and exhaust opening at the opposite ends thereof, the wall of said discharge muffler comprising inner and outer linings having acoustical material disposed therebetween and air flow passages extending through said wall at selected intervals therealong; a generally cylindrical casing disposed about said discharge muffler in spaced relation thereto so as to define an annular air flow chamber disposed between said casing and the outer lining of said muffler, said casing including, cooling air inlet ports communicating with said air flow chamber for the induced flow of air through said air flow chamber and air flow passages so as to form a moving layer of air within said discharge muffler for cooling the wall of said muffler; a sound absorbing layer disposed within said casing for the silenced introduction of air into said muffler and a gas inlet mouth portion to introduce the discharge gases from the engine being tested into said discharge muffler.

5. In an air silencer for use in the ground testing of jet engines or the like, an exhaust muffler wall structure defining a gas inlet and gas exhaust for the rearward discharge of gases therethrough, said muffler wall structure comprising: an acoustical facing and an acoustical backing in spaced relation, respectively constituting the inner and outer sides of said wall structure each incorporating a plurality of perforations therein, porous sound absorbing material disposed between said facing and backing and including a plurality of spaced passageways extending therethrough in communication between the plurality of perforations incorporated in said wall structure, and plate members closing the ends of said wall structure to retain said material between said facing and backing, the rearward discharge gas flow inducing the flow of cooling air through the perforations in said facing and backing and the spaced passageways extending through said porous material into the low pressure area surrounding the discharge gas flow so as to insulate and cool the muffler wall structure.

6. In an exhaust silencer for use in the ground testing of jet engines or the like, an air-cooled muffler wall construction, comprising: a pair of concentric perforated linings of frusto-conical section and disposed in spaced, parallel relation so as to form a rearwardly divergent exhaust muffler having a gas entrance opening at one end and gas exhaust opening at the opposite end thereof, porous sound absorbing material disposed between said perforate linings having a plurality of channels in intercommunication between the perforations of said pair of linings, and means interconnecting the forward edges and rearward edges of said linings to retain said sound absorbing material within said linings, the perforations in said linings constituting air passages for the induced flow of air therethrough to cool said muffler wall structure.

7. In an exhaust silencer for use in the ground testing of jet engines or the like, an exhaust muffler wall structure having a gas inlet opening at the forward end and a gas exhaust opening at the rearward end, said wall structure comprising an outer lining having air flow openings at spaced intervals along the forward and intermediate portions thereof and a sound absorbing wall surrounding the gas exhaust opening; a plurality of generally cylindrical air flow control surfaces staggered rearwardly in outer, fixed telescoping relation within said outer lining, and transverse divider members interconnecting said air flow control surfaces and outer lining so as to define a plurality of air flow passages communicating with air flow openings in said outer lining for the induced flow of air into said exhaust muffler.

8. An air-cooled silencer for the discharge of hot pressurized gases in the ground testing of jet engines or the like, comprising: an acoustical duct of frusto-conical section constituting an exhaust muffler having a gas entrance opening and rearwardly divergent exhaust opening at the opposite end thereof, said duct comprising rearwardly divergent, perforated tubular members in spaced, concentric relation so as to define the interior and exterior linings thereof and acoustical sound absorbing material disposed between said linings; gas conducting means extending forwardly from the gas entrance opening to a point adjacent the jet engine discharge end for the rearward discharge of gases into said exhaust muffler; and a generally cylindrical outer shell enclosing said exhaust muffler and gas conducting means, said outer shell being partially closed at its forward end to form a restricted opening for said gas conducting means and open at its rearward end for connection to the exhaust muffler, said outer shell disposed to form a closed annular chamber surrounding said gas conducting means and exhaust muffler, and a cooling air inlet passage disposed in said annular chamber including air inlet ports in said shell for the introduction of cooling air into said annular chamber, said passageway being insulated for the silenced flow of air therethrough, the discharge gas flow in said exhaust muffler inducing the flow of cooling air through said perforated linings for the cooling of said linings and acoustical material.

9. An air-cooled silencer according to claim 8 in which said cooling air inlet passages are comprised of a cylindrical inner wall section spaced concentrically within said outer shell adjacent the inlet ports in said shell, said inner wall and outer shell surfaces having a sound absorbing lining in spaced concentric relation thereto and acoustical material retained within said linings so as to define acoustical walls for said inlet passage for the silenced flow of air into said annular air flow chamber.

10. An air-cooled silencer according to claim 8 in which said acoustical, sound absorbing material is characterized by porous granular material packed between said interior and exterior linings and a porous fabric material disposed about the outer peripheral surface of said interior lining to retain said granular material between said linings as air is induced to flow through said perforated linings for the cooling of said exhaust muffler.

11. An air-cooled silencer for the discharge of hot pressurized gases in the ground testing of jet engines or the like, comprising: a rearwardly expanding discharge gas muffler having a gas entrance opening and exhaust opening at opposite ends thereof, the wall of said muffler comprising an outer perforated lining and an inner lining consisting of a row of air flow control tubes increasing rearwardly in diameter in staggered, concentric relation, said tubes having annular plates extending outwardly therefrom for connection to the outer lining so as to form cooling air flow passages at spaced intervals along said muffler a generally cylindrical casing disposed about said discharge muffler in spaced relation thereto so as to form an annular air flow chamber about said outer perforated lining, said casing having a sound absorbing wall on the inner surface thereof comprising a perforate liner spaced within said casing and acoustical material inserted therebetween, and an insulated cooling air inlet conduit communicating with said air flow chamber including air inlet ports for the induced flow of air through said air flow passages to form a moving layer of air along the inner lining of said muffler to cool the muffler wall, said casing being partially closed at its forward end for connection to the forward, inner concentric tube, said inner concentric tube constituting a gas inlet to introduce the discharge gases from the jet engine into the discharge muffler.

12. The air-cooled silencer construction according to claim 11 in which said annular plates are selectively positioned between said tubes and outer lining so as to form resonant chambers of predetermined frequency for the reduction of noise generated by the discharge gases.

13. The air-cooled silencer according to claim 11 in which each air flow control tube is disposed in overlapping, spaced relation with respect to the inner concentric air flow tube positioned in front of it to thereby direct a plurality of rearwardly moving layers of air into said exhaust muffler parallel to the discharge gas flow.

14. An air-cooled silencer for the silenced exhaust of gases in the ground testing of jet engines or the like comprising: a generally cylindrical outer shell having a restricted opening at the forward end thereof and an enlarged opening at the rearward end thereof, a gas inlet tube positioned in said restricted opening for the rearward discharge of gases therethrough; an inner concentric lining spaced within the said outer shell and projecting rearwardly through the enlarged opening at the rearward end of said outer shell, said lining perforated at the forward end thereof and having an insulated lining at the rearward end thereof so as to form a sound absorbing exhaust section for the discharge gases; and a plurality of air flow control tubes rigidly supported within said lining staggered rearwardly in outward, concentric relation from said gas inlet tube to the exhaust section of said lining, said outer shell including air inlet ports and acoustical lining disposed about the inner surface of said shell for the silenced flow of air through the perforated section of said lining and between concentric air flow control tubes.

15. The air silencer according to claim 14 in which air inlet ports are positioned in said inner concentric lining between the perforated section and rearward exhaust section for the increased supply of cooling air into the rearward air flow control tubes.

16. An air-cooled silencer unit for the silenced exhaust of gases in the ground testing of jet engines or the like, comprising: an exhaust muffler consisting of a cylindrical lining having a perforated air flow control surface at the forward portion thereof, enlarged openings arranged circumferentially about said lining behind said perforated air flow control surface to conduct an increased volume of air into said muffler and an imperforate cylindrical section at the rearward end thereof including an acoustical wall along the inner surface thereof to form a sound absorbing exhaust section for the discharge gases, a plurality of cylindrical air flow control tubes staggered rearwardly in outer, fixed telescoping relation within said outer cylindrical lining, the forward, inner concentric tube constituting a gas inlet mouth for discharge gases, and annular divider plates extending radially outwardly from the forward end of each tube for connection to said lining; and an outer concentric air silencer shell enclosing said lining so as to define an annular air flow chamber therebetween, said shell having air inlet ports at the rearward end thereof for the introduction of cooling air therein, said shell and said lining having acoustical wall sections disposed about the rearward ends of said shell and said lining in opposite, facing relation for the silenced flow of air through said air flow chamber and said enlarged openings into said exhaust muffler.

17. An air-cooled silencer to receive and exhaust gases discharged from a jet engine being tested, said silencer consisting of an outer shell having inlet ports at spaced intervals therealong; an exhaust muffler positioned within said shell having a relatively restricted inlet portion including a gas entrance opening and a relatively enlarged muffler portion extending at an angle thereto and including a gas exhaust opening, said muffler having an inner wall and an outer wall in spaced relation thereto with sound absorbing material positioned therebetween and transverse air flow passages at spaced intervals therealong; and a cooling air blower system communicating with the air inlet ports adjacent the transverse air flow passages in said relatively enlarged muffler portion to force air under positive, controlled pressure through said air flow passages so as to form a moving layer of air between said muffler and said discharge gases thereby insulating and cooling said muffler.

18. An air-cooled silencer for the silenced exhaust of gases in the ground testing of jet engines or the like, comprising: an elbow-shaped muffler diverging rearwardly from a gas entrance opening at one end to a gas exhaust opening at the opposite end thereof, the muffler wall comprising inner and outer linings and acoustical material disposed between said linings, said wall having air flow passages extending transversely therethrough at spaced intervals throughout said wall; an outer shell disposed about said wall in spaced relation thereto so as to define an air flow chamber therebetween, said shell having air inlet ports at spaced intervals therealong; and means including a duct system communicating with said air inlet ports in the elbow section of said muffler to force air under positive pressure through said air flow passages to cool said muffler wall structure and insulate said muffler wall from the discharge gases in the elbow section.

19. An air-cooled silencer for the discharge of high velocity, exhaust gases in the ground testing of jet engines or the like, comprising: a rearwardly divergent, elbow-shaped duct having a gas entrance opening at one end and a gas exhaust opening at the opposite end thereof, the wall of said duct comprising inner and outer perforated linings in spaced concentric relation and acoustical material inserted therebetween; an outer shell disposed in spaced relation about said duct and following the contour thereof so as to form an evenly spaced annular air flow chamber about the outer perforated lining of said duct, said shell having air inlet ports to introduce cooling air into said air chamber for the induced flow of air through said perforated wall structure at the forward portion thereof to form a layer of moving air along the inside of said wall, the forward wall portion of said duct constituting a generally tubular portion at the gas entrance opening to conduct the discharge gases into said duct; and an air blower unit including a header duct and air supply valves interconnecting said header and said air inlet ports in the elbow section of said silencer to force cooling air under positive, controlled pressure through said perforated wall in the elbow section to insulate and cool said wall from the discharge gases.

20. The air-cooled silencer according to claim 19 in which transverse annular septums are spaced axially throughout the length of said duct between said inner lining and outer shell so as to form divided, resonant chambers for the predetermined flow of air through the perforated wall of said duct.

References Cited in the file of this patent

UNITED STATES PATENTS

| | | |
|---|---|---|
| 1,292,283 | Faber | Jan. 21, 1919 |
| 1,546,262 | Stahl | July 14, 1925 |
| 2,661,072 | Lemmerman | Dec. 1, 1953 |